United States Patent [19]

Grögler et al.

[11] Patent Number: 4,605,756

[45] Date of Patent: Aug. 12, 1986

[54] PROCESS FOR THE IN SITU PRODUCTION OF UREA GROUP-CONTAINING ISOCYANATES IN POLYOLS

[75] Inventors: Gerhard Grögler, Leverkusen; Richard Kopp, Cologne; Heinrich Hess, Leverkusen, all of Fed. Rep. of Germany

[73] Assignee: Bayer Aktiengesellschaft, Leverkusen, Fed. Rep. of Germany

[21] Appl. No.: 682,623

[22] Filed: Dec. 17, 1984

[30] Foreign Application Priority Data

Dec. 28, 1983 [DE] Fed. Rep. of Germany ....... 3347247

[51] Int. Cl.$^4$ .......................................... C07C 119/048
[52] U.S. Cl. ........................................ 560/351; 528/59
[58] Field of Search .................... 260/453 AR, 453 P; 560/351

[56] References Cited

U.S. PATENT DOCUMENTS

| | | | |
|---|---|---|---|
| 3,023,228 | 2/1962 | Wagner et al. | 260/453 AR X |
| 3,271,346 | 9/1966 | Wakasa et al. | 260/30.8 |
| 3,649,600 | 3/1972 | Harper et al. | 260/77.5 AP |
| 3,906,019 | 9/1975 | Campbell et al. | 260/453 |
| 4,438,250 | 3/1984 | Grögler et al. | 528/66 |

FOREIGN PATENT DOCUMENTS

2902469 7/1980 Fed. Rep. of Germany .
1103329 11/1955 France .

*Primary Examiner*—Dolph H. Torrence
*Attorney, Agent, or Firm*—Gene Harsh; Joseph C. Gil

[57] ABSTRACT

The invention relates to a process for the in situ production of dispersions or solutions of urea group-containing aromatic isocyanates by the low temperature reaction of aromatic diisocyanates and/or polyisocyanates (the NCO groups of which preferably exhibit different reactivities) with from 0.15 to 0.4 mols of water per NCO equivalent in relatively high molecular weight polyols and in the presence of catalysts accelerating the NCO/water reaction. Such catalysts are preferably selected from peralkylaminoalkyl ethers, peralkylaminopolyalkylene ethers and/or peralkyl-polyalkylenepolyamines. The present invention also relates to the resulting metastable solutions or dispersions and to the use thereof, optionally with the further addition of relatively high and low molecular weight compounds having hydroxyl, amino or hydrazide groups and with the optional addition of other polyisocyanates in polyurethane-forming ratios for the production of polyurethanes.

5 Claims, No Drawings

PROCESS FOR THE IN SITU PRODUCTION OF UREA GROUP-CONTAINING ISOCYANATES IN POLYOLS

BACKGROUND OF THE INVENTION

Diisocyanates which contain urea groups are generally distinguished by a relatively high melting point. Due to the low vapor pressure thereof and due to the presence of the urea groups, they are preferably used as starting materials for the production of highgrade polyurethane/polyurea plastics. These diisocyanates are usually produced by reacting 2 mols of diisocyanate with 1 mol of water in an inert solvent. It is preferred to use diisocyanates which have two differently-reactive groups, when a definite reaction course is to be achieved. Thus, French Pat. No. 1,103,329 describes the production of bis-(3-isocyanato-4-alkoxy-, -alkyl- or chloro-phenyl) ureas by a reaction of diisocyanate and water in a molar ratio of 2:1, in a solvent, which solvent must not contain reactive hydrogen atoms (for example in the form of hydroxyl groups). Ethyl acetate, diethyl ether or acetone are preferably used as solvent.

U.S. Pat. No. 3,906,019 describes a process for the production of monomeric di-(isocyanatotolyl)-urea, in which the reaction is carried out in an excess of one of the two non-miscible reactants (toluylene diisocyanate and, preferably, water) at from 20° to 40° C. The urea which is not soluble in either of the starting materials is separated in a yield of from about 60 to 85%, mainly in monomeric form, and it must then be purified. Lewis acids or Lewis bases may be used as catalysts for the reaction described therein, but pyridine is preferred All these processes are carried out in solvents. The diisocyanates must be very soluble and the water which is added must be at least partly miscible in the solvents. The solvent must not exert a polymerizing effect on the isocyanate and must be free from isocyanate-reactive functional groups. The urea diisocyanates are produced as relatively insoluble compounds and are isolated by filtration. For further processing of these urea isocyanates for polyurethane production, it is necessary to convert the urea isocyanates obtained by filtration (and freed from solvents under vacuum) into a finely-divided form by a suitable grinding operation. As a result of the high melting point and the difficult solubility of these isocyanate ureas, inhomogeneous products are often obtained during the reaction.

According to German Auslegeschrift No. 2,902,469, suspensions of (poly)-urea-diisocyanates in isocyanate-prepolymers are produced by dissolving 1 mol of aromatic diisocyanate in the NCO-prepolymer and reacting it with from about 0.4 to 0.8 mols of water. Organic diisocyanates which have differently-reactive NCO groups are used to produce the NCO-prepolymers, as well as to produce the (poly)urea diisocyanates.

No process has been known in which a polyisocyanate containing urea groups is directly produced by reacting organic polyisocyanates with water in an NCO-reactive organic solvent, for example long-chain hydroxyl polyethers or hydroxy polyesters. According to the prior art, such a process would not seem very promising since the hydroxyl groups of the polyether or polyester generally have approximately the same reactivity with respect to NCO groups as water. Thus, it would be expected during the reaction of a polyisocyanate with water in a polyether or polyester for the NCO groups to react to about the same extent with the water and with the OH-groups of the polyol.

The separate production of urea-isocyanates, the isolation and purification thereof and the subsequent dispersion or dissolution of the urea-isocyanates in relatively high molecular weight polyols, such as are used for the synthesis of polyurethanes, is expensive. An object of the present invention is to synthesize urea isocyanates directly in the relatively high molecular weight polyols from aromatic isocyanates which are easily accessible in a simple and economic process, in order to be able to use these urea isocyanate/polyol dispersions or solutions directly for the synthesis of polyurethanes.

DESCRIPTION OF THE INVENTION

It has now been found that it is possible to synthesize dispersions or solutions of urea group-containing aromatic isocyanates, and preferably diisocyanates, in relatively high molecular weight polyols by in situ production from an aromatic isocyanate and water in the presence of certain catalysts at a relatively low temperature. The products are stable in storage at room temperature or at a slightly elevated temperature for a relatively long period of time of up to several days. They may then be used directly for the synthesis of polyurethanes, and polyurethane ureas, optionally with the addition of other polyisocyanates and/or other low and/or relatively high molecular weight compounds containing reactive hydrogen atoms. Surprisingly, the reaction of the aromatic isocyanates with water in relatively high molecular weight polyols may be controlled by the presence of the particular catalysts, so that the NCO-/water reaction takes place preferentially with the formation of urea isocyanate and clearly before the NCO-/polyol reaction. Once the polyurea isocyanates have formed, the further reaction thereof with polyols is greatly delayed so that the dispersions or solutions may be easily handled at room temperature or at a slightly elevated temperature as metastable systems to be used for the production of polyurethanes at higher temperatures.

Thus, the present invention provides a process for the in situ production of dispersions or solutions of urea group-containing aromatic isocyanates by reacting aromatic isocyanates with water in solvents, characterized in that:

(a) aromatic diisocyanates and/or polyisocyanates, preferably diisocyanates, which have differently-reactive NCO groups, are reacted in (b) relatively high molecular weight, liquid or low-melting, di- or poly-hydric polyols having molecular weights of from 400 to 10,000, preferably from 600 to 6,000 (preferably liquid polyether polyols having mainly secondary hydroxyl groups), with (c) from about 0.15 to about 0.40 mols, preferably from about 0.22 to about 0.28 mols, of water, per NCO equivalent in (a), in the presence of (d) from about 0.1 to about 2.5%, by weight, preferably from about 0.4 to about 1.2%, by weight, based on the aromatic polyisocyanate (a), of catalysts accelerating the NCO/water reaction, said catalysts preferably selected from peralkylamino-alkyl ethers, peralkylamino-polyalkylene ethers and/or peralkyl-polyalkylene-polyamines, at a temperature of up to 80° C., preferably from 10° to 50° C., until the end of the evolution of $CO_2$. The preferred quantities are 0,1 to 40 parts by weight of (a) for 100 parts of (b). The more preferred quantities are 5 to 25 parts by weight of (a) and most preferred 7 to 20 parts by weight of (a) For 100 parts of (b).

The present invention also is directed to the dispersions or solutions of urea group-containing aromatic isocyanates in relatively high molecular weight polyols having a free NCO group content of from 0.1 to 10%, preferably from 1 to 5%, which dispersions or solutions are produced by the present process.

Furthermore, the present invention relates to the use of the dispersions or solutions of urea group-containing aromatic isocyanates in relatively high molecular weight polyols, which dispersions or solutions are obtained by the present process, optionally with the further addition of low molecular weight and/or relatively high molecular weight compounds (preferably di- and/or higher functional compounds which contain active hydrogen isocyanate-reactive groups, and in particular hydroxyl groups, primary and/or secondary amino groups and/or hydrazide groups), and optionally with the addition of other polyisocyanates, in polyurethane-forming ratios, preferably in ratios of NCO to active hydrogen of from 0.7:1 to 1.3:1, and in particular from 0.9:1 to 1.15:1, for the production of polyurethane ureas.

It was surprising that a reaction to produce urea isocyanates in polyols according to the present process takes place in such a favorable manner when the particular catalysts of the NCO/water reaction are used, because these catalysts produce completely different products, namely oligomeric urea isocyanates or polyureas, when it is attempted to carry out a reaction in solvents, for example acetone (see Comparative Example). The catalysts which are used according to the present invention are known in polyurethane chemistry. They are used in large quantities for the production of flexible polyurethane foams. In so doing, they serve to coordinate the foam-forming water/NCO reaction with the other reactions between isocyanates and polyols, which reactions synthesize the polyurethane matrix.

Catalysts exhibiting a ratio of the rate constants of the water reaction to the alcohol reaction ($k_{H_2O}:k_{ROH}$) of at least 1.5, preferably at least 2.0, in a test carried out as described in J. Cellular Plastics 1965, pages 76 to 84, are suitable for use in accordance with the present invention.

Catalysts of this type are described in, for example, the following patents: French Pat. No. 1,426,198; U.S. Pat. No. 3,645,925, German Auslegeschriften Nos. 2,139,317; and 1,804,361 (corresponding to U.S. Pat. No. 3,694,510).

Preferred catalysts include the following: (i) peralkylamino-alkyl ethers such as bis-(dimethylaminoethyl)-ether; bis-(morpholinoethyl)-ether; 2-(dimethylamino-ethyl-3-dimethylaminopropyl)-ether; bis-[2-(N,N-dimethylamino)-1-methylethyl]-ether, 2-(N,N-dimethylamino)-ethyl-2-(N,N-dimethylamino)-1-methylethyl-ether; bis-[2-(N,N-diethylamino)ethyl]ether: methyl-2-(N,N-dimethylamino)-ethyl ether; bis-[3-(N,N-dimethylamino)-propyl]-ether; and the like; (ii) peralkylamino-polyalkylene ethers, such as (CH$_3$)$_2$N.CH$_2$CH$_2$.O.CH$_2$CH$_2$.O.CH$_2$CH-$_2$.O.CH$_2$CH$_2$N(CH$_3$)$_2$; (C$_2$H$_5$)$_2$.N.(CH$_2$)$_2$-O-(CH$_2$)$_2$.O.(CH$_2$)$_2$.O.(CH$_2$)$_2$.N(C$_2$H$_5$)$_2$; and the like; and/or (iii) peralkylpolyalkylene-polyamines, such as N-pentamethyl-diethylene triamine; N-hexamethyl-triethylene tetramine; N-heptamethyl-tetraethylene-pentamine and the like. Other suitable compounds include, for example: [1,3-bis-(dimethylamino)-propyl-2]-2-dimethylaminoethyl-ether, N-methyl-morpholine, N-ethyl-morpholine and N,N,N',N'-tetramethyl-1,3-butane diamine; and the like.

These catalysts are used in concentrations of from about 0.1 to about 2.5%, by weight, based on the aromatic isocyanate (a), but concentrations of from about 0.4 to about 1.2%, by weight, are more preferred.

In particular, all soluble aromatic isocyanates and preferably diisocyanates, having differently-reactive NCO groups are suitable as aromatic isocyanates in the present process. For example, these include diisocyanates which, in addition to having one free, i.e. sterically-unhindered, aromatically-bound isocyanate group, have another aromatically-bound isocyanate group which is sterically hindered by at least one substituent in the o-position. Substituents of this type which may lead to a steric hindrance of the isocyanate group include in particular C$_1$-C$_8$ alkyl, C$_6$-C$_{10}$ aryl, C$_1$-C$_8$ alkoxy, C$_1$-C$_8$ alkoxycarbonyl, chloro, bromo or cyano. Moreover, a steric hindrance of the aromatically-bound isocyanate groups is produced if the basic structure of the isocyanate is a system of several aromatic rings, which is optionally linked via bridge members, such as alkylene groups, ether groups, sulphoxide groups or sulphone groups, and if the (sterically-hindered) isocyanate group is in the ortho position to the bridge member linking two aromatic rings.

Aromatic diisocyanates which are particularly preferred include those, for example, corresponding to the following general formulae (I) and (II):

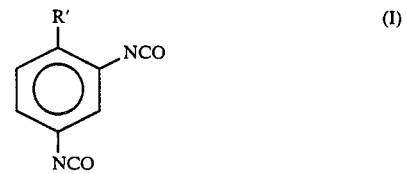

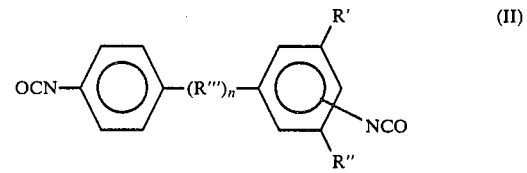

wherein
R' and R" independently represent a group of the type noted above causing the steric hindrance of the isocyanate group; and in the case of the products corresponding to general formula (II), one of the radicals R' and R" may also represent hydrogen; or, in general formula (II), both R' and R" may also represent hydrogen if one of the isocyanate groups is in the ortho position to the bridge R''' or, if n=0, is in the ortho position to the left-hand aromatic radical;
R''' represents a bridge of the type exemplified above which links the aromatic rings; and
n represent 0 or 1.

It is also possible to use mixtures of aromatic diisocyanates in the present process, which mixtures contain aromatic diisocyanates having isocyanate groups of the same reactivity, for example, 4,4'-diisocyanato-diphenyl methane or 2,6-diisocyanatotoluene, if the proportion of such diisocyanates having isocyanate groups of the same reactivity does not exceed an upper limit of 50%, by weight, and preferably 40%, by weight, based on the total mixture.

Diisocyanates which are particularly preferred and are suitable for the present process include, for example: (i) 2,4-diisocyanatotoluene, optionally in admixture with up to 50%, by weight, based on the total mixture, of 2,6-diisocyanatotoluene, and (ii) 2,4'-diisocyanatodiphenyl methane, optionally in admixture with up to 50%, by weight, based on the total mixture, of 4,4'-diisocyanatodiphenyl methane. The following are also suitable: 2,4'-diisocyanatodiphenyl propane; 2,4'-diisocyanatodiphenyl ether; 2,4'-diisocyanatodiphenyl sulphone; 2,4'-diisocyanatodiphenyl sulphodioxide; 3-methyl-4,4'-diisocyanatodiphenyl methane; 3-ethyl-4,4'-diisocyanatodiphenyl methane; 3-isopropyl4,4'-diisocyanatodiphenyl methane; 3,5-dimethyl-4,4'-diisocyanatodiphenyl methane; 3,5-diethyl-4,4'-diisocyanatodiphenyl methane; 3,5-diisopropyl-4,4'-diisocyanatodiphenyl methane; 3-carboxymethyl-4,4'-diisocyanatodiphenyl methane; 3-carboxyethyl-4,4'-diisocyanatodiphenyl methane; and the like.

In the present process, relatively high molecular weight di- or poly-hydric polyols which are suitable for the production of the urea isocyanates include polyesters, polyethers, polythioethers, polyacetals, polycarbonates or polyester amides which preferably have from 2 to 4 hydroxyl groups, in particular 2 hydroxyl groups, and have a molecular weight of from 400 to 10,000, preferably from 600 to 6000, such as are known for the production of non-cellular or cellular polyurethanes. Polyether polyols or polyester polyols which are liquid or are low-boiling ($<50°$ C.) at room temperature are preferably used. In particular, liquid polyethers of known type which have two or more hydroxyl groups are used according to the present invention. They are produced, for example, by the polymerization of epoxides, such as ethylene oxide, propylene oxide, butylene oxide, styrene oxide, epichlorohydrin and tetrahydrofuran, for example in the presence of $BF_3$, or by adding these epoxides, optionally in admixture or successively, to starting components having reactive hydrogen atoms, such as water, alcohols or amines. Polyethers which have predominantly secondary hydroxyl groups are often preferred. Polyethers which contain quantities of ethylene oxide groups are, however, more reactive as polyols in the subsequent use of the mixtures for the synthesis of polyurethanes, and polyethers which have a greater content of ethylene oxide are better solvents for the urea isocyanates which are formed. In fact, some urea diisocyanates may even completely dissolve in suitable polyethers.

Ethers which are modified by vinyl polymers as are produced, for example, by the polymerization of styrene and acrylonitrile in the presence of polyethers, are also suitable.

The liquid or low-melting polyesters which contain hydroxyl groups and are included as relatively high molecular polyols (b) are the known reaction products of polybasic, preferably dibasic, carboxylic acids, carboxylic acid anhydrides or carboxylic acid esters with di- and/or poly-hydric polyols. The polycarboxylic acids may be aliphatic, cycloaliphatic, aromatic and/or heterocyclic and may be substituted, for example by halogen atoms, and/or they may be unsaturated. Examples include succinic acid, adipic acid, sebacic acid, phthalic acid, isophthalic acid, phthalic acid anhydride, trimellitic acid tetrachlorophthalic acid anhydride, glutaric acid anhydride, maleic acid anhydride, terephthalic acid dimethyl ester and terephthalic acid-bis-glycol ester. The following are included as polyhydric alcohols, for example: ethylene glycol, propane diol-1,2 and -1,3; butane diol-1,3, -1,4 and -2,3; hexane diol-1,6; neopentyl glycol; 2-methyl-1,3-propane diol; trimethylol propane; diethylene glycol; dipropylene glycol; dibutylene glycol; and other polyhydric alcohols. To produce liquid polyesters, mixtures of the starting components are preferably used. Polyesters of lactones, (for example ε-caprolactone) or hydroxy carboxylic acids may also be used, as may polycarbonates which contain hydroxyl groups or polyhydroxyl compounds which contain urethane or urea groups, and optionally modified natural polyols, such as castor oil. Additional examples of the various compounds which may be used according to the present invention are described in High Polymers, Vol. XVI, "Polyurethanes, Chemistry and Technology", by Saunders-Frisch, Interscience Publishers, New York, London, Vol. I, 1962, pages 32 to 42 and pages 44 to 54 and Vol. II, 1964, pages 5 to 6 and 198 to 199 and in Kunststoff-Handbuch, Vol. VII, Vieweg-Höchtlen, Carl-Hanser-Verlag, Munich, 1966, for example on pages 45 to 71.

Of course, mixtures of the above-mentioned compounds, for example mixtures of polyethers and polyesters, may be used.

The quantity of water which is used to form the urea isocyanates from aromatic isocyanates theoretically amounts to 0.25 mols of water per NCO equivalent. However, the quantity of water which is used may be varied over wide limits, and generally ranges from about 0.15 to about 0.40 mols per NCO equivalent and preferably from about 0.22 to about 0.28 mols of water per NCO equivalent, in which case either only some of the isocyanate groups are converted into urea isocyanates, or a small amount of the urea isocyanates reacts further with the formation of urea. It has been found, as shown in the Examples, that although urea isocyanates are formed for the most part, at the same time there is a certain further reaction of the isocyanates and/or of the urea isocyanates with the relatively high molecular weight polyols (b). This may be recognized from the remaining NCO content in the dispersions or solutions according to the present invention which generally lies below the theoretical value. However, as a result of this polyol, the dispersions in particular of the diisocyanates containing urea groups are protected against sedimentation, because they remain more effectively dispersible as a result of the small quantities of polyol which are bound via urethane linkages.

The process according to the present invention is preferably carried out such that a mixture of the polyol, of the calculated quantity of water and the particular catalyst is mixed with the aromatic isocyanate at the selected reaction temperature. The reaction generally takes place at a temperature of up to 80° C., preferably at from about 10° to 50° C.

The course of the reaction may easily be followed and controlled by determining the volume of gas (evolution of carbon dioxide during the formation of urea). Sparingly soluble urea isocyanates are produced in a finely-divided form after exceeding the solubility limit and sedimentation-stable dispersions are obtained for the most part. Depending on the viscosity of the starting materials and on the concentrations of urea isocyanate obtained, dispersions of the urea isocyanates (which are flowable at room temperature), are in the form of pastes or may be liquified by heating to a maximum temperature of 80° C. In the case of ureapolyisocyanate concentrations in the polyol mixture of up to 15%, by weight, pourable dispersions which are still liquid are generally obtained. When polyols are used which have a relatively high polarity (and therefore a better dissolving ability for the urea polyisocyanate which forms in situ) solutions of urea isocyanates may be obtained, or a disperse phase forms only after standing for a relatively long period of time, or by inoculation.

The reaction of the water with the aromatic isocyanate (a) generally takes place so completely that the resulting suspensions contain only small residual quantities of free, unreacted monomeric isocyanate (a) (see Examples). This is particularly significant in a physiological respect when diisocyanates (a) are used which have a relatively high vapor pressure (for example diisocyanatotoluene). Thus, urea isocyanate suspensions which have a content of monomeric isocyanates (a) of <0.6%, by weight, are obtained according to the present process, if at least the stochiometric amount of water (0,25 mol $H_2O$ per NCO-equivalent) has been used.

Depending on the polyol which is used, the dispersions may be kept for several days at room temperature until, by the reaction of the remaining NCO groups of the urea isocyanate with the polyol (b), a viscosity is attained which makes further processing impossible. As mentioned above, the urea isocyanate dispersions or solutions which are obtained according to the present invention may be used for the production of polyurethane (urea)s preferably with heating and optionally after adding other conventional polyurethane catalysts and optionally after adding other di- or poly-isocyanates and/or low molecular weight and/or relatively high molecular weight compounds which contain reactive hydrogen atoms, i.e. chain-lengthening agents based on diols, diamines or hydrazide compounds or relatively high molecular weight polyols or relatively high molecular weight polyamines. The NCO groups of the urea isocyanate react at the elevated temperature with, inter alia, the OHF-groups of the polyol which acts as a dispersing agent. This hardening operation to produce polyurethanes generally takes place at a temperature of from 80° to 150° C., more preferably from 110° to 130° C. The urea isocyanates which are produced in situ according to the present invention may be used in the polyols to produce polyurethane(urea)s.

If the NCO groups and the OH groups in the polyols are present in approximately equivalent quantities, a hardening operation to produce polyurethane(urea)s may be carried out in a simple form by a thorough heating. However, since the chain-lengthening agents which are usually used are not present in this case, polyurethane elastomers which are only relatively flexible (even if they are non-tacky) are obtained.

If, in addition to the urea isocyanate/polyol dispersions, other low molecular weight chain-lengthening agents containing active hydrogen atoms are simultaneously used (for example diols, polyols or diamines) then more rigid types of elastomers are produced. However, it is possible to add, preferably in quantities of up to 20 parts by weight per 100 parts of the isocyanate/polyol dispersion, low molecular weight chain-lengthening agents of the type mentioned above, as well as relatively high molecular weight compounds, such as polyols or polyamines, preferably aromatic polyamines, such as may be obtained, for example, by the alkaline hydrolysis of NCO prepolymers, and optionally other di- and/or poly-isocyanates. In this manner, it is possible to vary the synthesis of the resulting polyurethane(urea)s within wide limits. In another embodiment, isocyanate groups of the urea isocyanate/polyol dispersions may first be partially or completely reacted with monohydric alcohols (for example methanol, ethanol and octanol), monoamines (for example ammonia, methylamine, aniline, toluidine, naphthylamine and diethylamine) or difunctional compounds (such as diols, for example ethylene glycol, butane diol-1,4, and bisphenol A). When an excess of difunctional or higher functional compounds which contain the same or, preferably, different reactive groups is used, for example ethylene glycol and butane diol, or amino alcohols, such as ethanolamine, diethanolamine or N-methyl ethanolamine, polyol dispersions are produced which contain fillers and which may be isocyanate-active. The polyol dispersions, which contain fillers, are optionally isocyanate-reactive and are produced according to these methods using mono- or di-functional compounds, may be reacted to produce polyurethane(urea)s after the addition of other chain-lengthening agents or relatively high molecular weight compounds, such as polyols or polyamines, and with the addition of other di- or polyisocyanates. This reaction generally takes place within a temperature range of from 80° to 150° C. and, depending on the starting components used, flexible to rigid materials are obtained.

Of course, when the urea isocyanate/polyol dispersions or solutions are used to produce polyurethanes with conventional polyurethane catalysts, as well as auxiliaries and additives, they may be used as the only synthesis component or as one of the synthesis components. Such auxiliaries and additives include light- or UV-stabilizers, adhesion-preventing agents, pigments or dyes, or blowing agents which make it possible to produce cellular or foam-like polyurethanes.

The invention is further illustrated, but is not intended to be limited by the following examples in which all parts and percentages are by weight unless otherwise specified.

EXAMPLE 1

87.0 g (0.5 mols) of 2,4-toluylene diisocyanate are added dropwise at room temperature over a period of about 1 hour to a mixture of 500 g of a propylene oxide-polyether (which was started on 1,2-propane diol and which has an OH number of 56 and a molecular weight of 2000) (0.25 mols), 4.5 g of water (0.25 mols) and 0.5 g of a tertiary amine catalyst (A–F, see Table 1). The mixture is then stirred for 1 hour at room temperature and for up to 1 hour at 50° C.

Table 1 below shows the results which were found as a function of the catalyst which was used. With the selective formation of the toluylene-urea-diisocyanate without secondary reactions, an NCO content of 3.6%, by weight, is theoretically calculated with the evolution of 5.6 liters of $CO_2$ (under normal conditions).

As shown by the results of Table 1, in sample A, a reaction takes place almost only between the hydroxyl groups of the polyether polyol and the more reactive of the NCO groups, while there is virtually no water reaction when a catalyst is not used. In sample B, a catalyzed water reaction takes place at the same time as a catalyzed hydroxyl reaction with the polyether when the catalyst not according to the present invention is used, so that although the calculated quantity of $CO_2$ is evolved, the NCO content of the dispersion is reduced further than the theoretical value and the viscosity of the dispersion itself increases very considerably as a result of the polymer-synthesizing reaction with the two NCO groups.

Even with the catalyst not according to the present invention of sample C there is mainly a reaction with the polyether hydroxyl with the linking of polymers and only a very slight urea formation (water reaction with the evolution of $CO_2$).

In the samples D-F according to the present invention, a very vigorous evolution of $CO_2$ takes place due to the action of the catalysts according to the present invention, i.e urea forms without the viscosity of the dispersion increasing substantially. This shows that an NCO/hydroxyl group reaction has taken place to only a slight extent. The dispersions D-F according to the present invention exhibit a good dispersion stability. According to gas chromatographic analysis, sample F contains less than 0.03%, by weight, of free 2,4-toluylene diisocyanate.

EXAMPLE 2

87.0 g (0.5 mols) of 2,4-toluylene-diisocyanate are added dropwise at room temperature over a period of 1 hour to a mixture consisting of 500 g of a polyether (see Table 2 below for variations of polyethers), 4.5 g (0.25 mols) of water and 0.5 g of heptamethyl-tetraethylene pentamine. The mixture is then stirred for 0.5 to 1 hour at room temperature and for up to 1 hour at 50° C.

Table 2 shows the results which were found as a function of the relatively high molecular weight polyether polyol which was used.

It is found that relatively high molecular weight polyols may also be used in the present process, that polyols containing secondary hydroxyl groups are generally more suitable than primary hydroxyl groups for the production of the dispersion and that the proportion of ethylene oxide blocks within the polyethers provides a greater solubility for the urea diisocyanate.

| Sample | Catalyst | NCO-content of the dispersion | Viscosity (mPa · s/25° C.) | Quantity of $CO_2$ evolved* (in liters) |
|---|---|---|---|---|
| A | Not acc. to present invention | without | 3.40%, by weight | 2,000 | 0 |
| B |  | triethylene diamine 33% solution | 1.1%, by weight | 40,000 | 5.7 |
| C |  | 1-dimethylamino-propanol-3 | 2.6%, by weight | 22,000 | 0.3 |
| D | Acc. to present invention | bis(dimethylamino-ethyl)ether | 1.8%, by weight | 6,000 | 6.3 |
| E |  | pentamethyl-di ethylene triamine | 2.1%, by weight | 5,000 | 5.9 |
| F |  | heptamethyl-tetra-ethylene pentamine | 2.5%, by weight | 3,200 | 5.5 |

*Values not corrected to normal conditions.

| Polyether | OH No. | Molecular weight | Functionality | NCO content of the urea-diisocyanate/polyol mixture | Condition | Viscosity (in mPa · s/25° C.) |
|---|---|---|---|---|---|---|
| A PG ←— PO | 56 | 2000 | 2 | 2.5%, by weight | Dispersion | 3,200 |
| B PG ←79%— PO \| ←21%— EO | 28 | 4000 | 2 | 2.6%, by weight | Dispersion | 400,000 |
| C {TMP + PG} ←5%— PO \| ←30% EO / 39.5% PO — \| \| ←25.5 PO— | 42 | 3700 | 2.78 | 3.5%, by weight | Dispersion | 4,500 |
| D {TMP + PG} ←— PO | 56 | 2900 | 2.91 | 2.5%, by weight | Dispersion | 15,000 |
| E PG ←— PO | 41 | 2740 | 2 | 3.6%, by weight | Dispersion | 3,500 |
| F PG ←— PO | 75 | 1500 | 2 | 2.5%, by weight | Dispersion | 3,500 |
| G PG ←47.5% PO— \| ←43% EO— \| \| ←10% PO— | 56 | 2000 | 2 | 2.2%, by weight | Solution | 2,400 |

| Polyether | OH No. | Molecular weight | Function-ality | NCO content | Condition of the urea-diisocyanate/polyol mixture | Viscosity (in mPa · s/25° C.) |
|---|---|---|---|---|---|---|
| H PG ⟵ 3% PO \| ⟵ 30% EO / 57% PO ) \| \| ⟵ 10% EO | 56 | 2000 | 2 | 1.8%, by weight | Solution | 9,000 |

PG = 1,2-Propylene glycol
TMP = Trimethylolpropane

⟵ Alkoxylation reaction

| ⟵ Second Alkoxylation stage

| | ⟵ Third Alkoxylation stage

PO = Propylene oxide
EO = Ethylene oxide

EXAMPLE 3

64.75 g (0.25 mols) of a mixture of 60%, by weight, of 2,4'- and 40%, by weight, of 4,4'-diisocyanatodiphenyl methane are added dropwise at room temperature over a period of about 1 hour to a mixture of 500 g of a linear polypropylene glycol polyether having an OH number of 56, 2.25 g (0.125 mols) of water and 0.25 g of heptamethyltetraethylene pentamine. The mixture is then stirred at 50° C. until 2.7 liters of $CO_2$ have evolved.

The resulting dispersion has an NCO content of 1.5%, by weight, and a viscosity of 4600 mPa.s/25° C.

EXAMPLE 4

A sample of the dispersion produced in Example 2(C) is heated to 120° C. for 1.5 hours in a flat mold. A flexible, non-tacky plastics material is obtained which has a Shore A surface hardness of 55.

EXAMPLE 5

(A) The dispersion obtained in Example 2(A) is mixed with 19.61 g of ethylene glycol and stirred at 50° C. until all of the NCO groups have reacted. A dispersion is obtained which has a viscosity of 11,000 mPa.s/25° C. OH No. calculated 59.1.

(B) 1105 g of a dispersion produced according to Example 2(A) having an NCO content of 2.4%, by weight, are mixed with 57.2 g of butane diol-1,4 and stirred at 50° C. until all of the NCO groups have reacted. A dispersion is obtained which has a viscosity of 250,000 mPa.s/25° C.

(C) 200 g of the dispersion obtained according to Example 2(G) are mixed with 5.38 g of ethylene glycol and stirred at 50° C. until all of the NCO groups have reacted. A clear, yellowish solution is obtained having a viscosity of 25,000 mPa.s/25° C.

(D) 250 g of the dispersion obtained in Example 2(A) are mixed with 15.0 g of diethanolamine and stirred for 5 hours at room temperature. A dispersion is obtained having a viscosity of 5,000 mPa.s.

EXAMPLE 6

87.0 g (0.5 mols) of 2,4-toluylene diisocyanate are added dropwise at room temperature over a period of about 1 hour to a mixture of 500 g of a diethylene glycol/adipic acid polyester having an OH number of 41.2 and an acid number of 0.8, 4.5 g (0.25 mols) of water and 0.5 g of heptamethyltetraethylene pentamine. The mixture is then stirred for about 30 minutes at 50° C. A total of 5.4 liters of $CO_2$ evolves.

A high viscosity dispersion is obtained having an NCO content of 1.8%, by weight, which gradually solidifies at room temperature.

When a sample of this dispersion is heated to 120° C., a non-tacky, highly elastic flexible foam is obtained after about 30 minutes.

EXAMPLE 7

174 g (1 mol) of 2,4-toluylene diisocyanate are added dropwise at room temperature over a period of about 2.5 hours to a mixture of 1000 g of a linear polypropylene glycol polyether having an OH number of 56, 9 g of water (0.5 mols) and 1.0 g of heptamethyl-tetraethylene pentamine. The mixture is then stirred at 40° C. until 11.2 liters of $CO_2$ have evolved.

A dispersion having an NCO content of 2.74%, by weight, is obtained.

500 g of the dispersion are mixed with 29.25 g of butane diol at room temperature and stirred at from 40° to 50° C. until all of the NCO groups have reacted. Dispersion A—11,000 mPa.s at room temperature.

34.125 g of diethanolamine are added dropwise with cooling to 500 g of the dispersion. The mixture is then stirred until all of the NCO groups have reacted. Dispersion B—8,000 mPa.s at room temperature.

50 parts of dispersion (A) are mixed with 8.9 parts of liquid 4,4'-diisocyanatodiphenyl methane, degassed at 50° C. for about 5 minutes and then thoroughly heated at 120° C. in a mold. After about 6 hours, a non-tacky plate is obtained which has a Shore A surface hardness of 25.

50 parts of dispersion (B) are mixed with 12.6 parts of liquid 4,4'-diisocyanatodiphenyl methane, degassed at 50° C. for about 5 minutes and then thoroughly heated at 120° C. for 6 hours in a plate mold. An elastic plate is obtained which has a Shore A surface hardness of 75.

EXAMPLE 8

(Comparative experiment carried out in low molecular weight solvent (acetone) instead of in relatively high molecular weight polyols)

A mixture of 2.25 g of water (0.125 mols), 10 ml of acetone and 0.2 g of N-heptamethyl-tetraethylene pentamine is added at room temperature to a mixture of 180 ml of acetone and 43.5 g of 2,4-toluylene diisocyanate (0.25 mols). The mixture is then stirred for 3 hours at room temperature. After suction and drying, 40.5 g of a solid substance are obtained having a melting point of about 250° C. and an NCO content of only 7.5%, by weight.

Although high yields of urea diisocyanate are obtained, the product has only a small NCO content, because the addition reaction with water does not remain at the stage of the mono-urea, but continues to the oligomeric stage with a considerably reduced NCO content and a higher molecular weight or reduced solubility.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the in situ production of dispersions or solutions of urea group-containing aromatic isocyanates by the reaction of aromatic isocyanates with water in solvents, characterized in that:
   (a) aromatic diisocyanates and/or polyisocyanates are reacted in
   (b) relatively high molecular weight liquid or low-melting di- or poly-hydric polyols having molecular weights of from 400 to 10,000 with
   (c) from about 0.15 to about 0.40 mols of water per NCO equivalent, in the presence of
   (d) from about 0.1 to about 2.5%, by weight, based on aromatic polyisocyanates, of catalysts which accelerate the NCO/water reaction to a greater extent than the NCO/hydroxyl reaction, at a temperature of up to 80° C. until the end of $CO_2$ evolution.

2. A process according to claim 1, characterized in that aromatic diisocyanates having differently-reactive NCO groups are used as (a).

3. A process according to claim 1, characterized in that liquid polyols based on polyethers or such polyols which melt at a temperature below 50° C. and have predominantly secondary hydroxyl groups and molecular weights of from 600 to 6,000 are used as (b).

4. A process according to claim 1, characterized in that from about 0.22 to about 0.28 mols of water per NCO equivalent are used.

5. A process according to claim 1, characterized in that catalysts selected from the group consisting of peralkyl-aminoalkyl ethers, peralkylamino-polyalkylene ethers, peralkyl-polyalkylene polyamines and mixtures thereof are used as (d) and that the diisocyanates are reacted in liquid polyols (b) at a temperature of up to 50° C.

* * * * *